United States Patent [19]
Gaughan et al.

[11] Patent Number: 5,746,484
[45] Date of Patent: May 5, 1998

[54] E/P INTERFACE WITH PNEUMATIC CONTROL VALVE FOR BACK-UP BRAKE ARRANGEMENT

[75] Inventors: Edward W. Gaughan, Irwin; Vincent F. Troiani, New Florence, both of Pa.

[73] Assignee: Westinghouse Air Brake Company, Wilmerding, Pa.

[21] Appl. No.: 693,643

[22] Filed: Aug. 9, 1996

[51] Int. Cl.[6] .................................................. B60T 13/74
[52] U.S. Cl. ........................................ 303/3; 303/15
[58] Field of Search ................................ 303/3, 15, 20, 303/7, 36, 16, 80; 364/426.023

[56] References Cited

U.S. PATENT DOCUMENTS 5,192,118  3/1993  Balukin et al. ......................... 303/15
5,393,129  2/1995  Troiani et al. ....................... 303/15 X
5,503,467  4/1996  Gaughan ................................... 303/3

Primary Examiner—Lee W. Young
Attorney, Agent, or Firm—Gary J. Falce

[57] ABSTRACT

A combined automatic pneumatic and electro-pneumatic brake system for a railroad freight car in which a conventional type ABD control valve device is modified to incorporate a solenoid valve portion at a mounting face from which the manual release valve portion has been removed and where existing passages in the control valve may be accessed in order to utilize the existing car control valve device with only a minimum of modification.

4 Claims, 1 Drawing Sheet

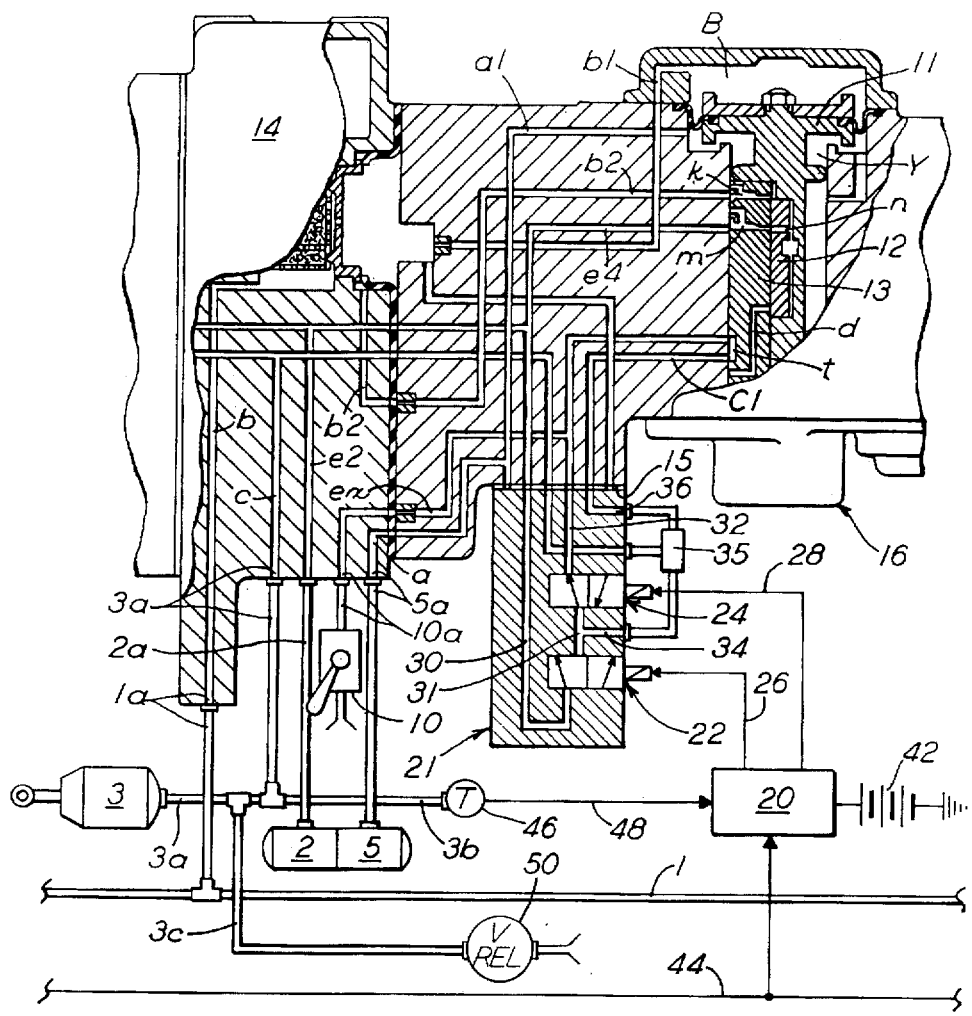
FIG. 2
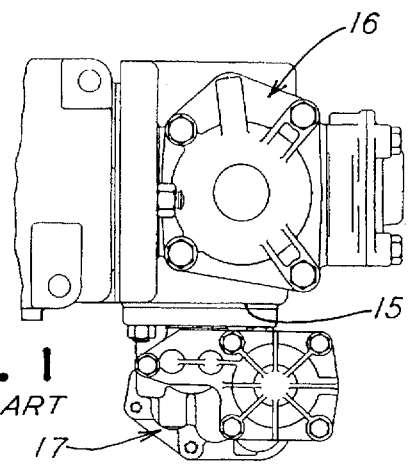
FIG. 3
| SOLEN. VALVE | 22 | 24 |
|---|---|---|
| RELEASE/CHARGE | D | D |
| APPLICATION | E | E |
| LAP | D | E |
FIG. 1
PRIOR ART

E/P INTERFACE WITH PNEUMATIC CONTROL VALVE FOR BACK-UP BRAKE ARRANGEMENT

BACKGROUND OF THE INVENTION

The present invention relates to a brake control system for railroad freight cars and in particular to such a brake control system that integrates electro-pneumatic control of the brake with the conventional automatic pneumatic brake control.

From the inception of the early Westinghouse air brake, until the present time, compressed air has been employed as the medium by which brake control signals have been transmitted through a train of railroad freight cars, as well as the force by which friction retardation is applied through brake shoes that engage the car wheel treads during braking. As the size of freight cars has increased to provide greater load carrying capacity, and the number of cars capable of being hauled in a train has likewise grown, there have been continued improvements in the air brake system to make it more efficient, in order to provide better stopping ability consistent with the greater demands placed on the air brake system.

Electro-pneumatic brake control systems are known to extend the capability of the air brake beyond that which is achieved with the conventional automatic pneumatic brake control system presently employed. These improved capabilities are possible due primarily to the fact that the brake control signal can be transmitted instantaneously to each car in the train, whereas propagation of a pneumatic control signal is limited to a value approaching the speed of sound. By instantaneously transmitting a brake control signal to each car of a train, not only is the time required to initiate braking action on all of the cars reduced, but in-train forces, due to disproportionate brake buildup timing between the cars, are better controlled. This permits greater brake force to be employed to achieve shorter stop distance without incurring damage to car lading and couplers, and without creating the potential for a train derailment.

The present automatic pneumatic brake control system is fail-safe in the sense that a train break-in-two will result in an emergency brake application on both halves of the separated train without any initiative on the part of the locomotive engineer. Electro-pneumatic brakes also offer the possibility of fail-safe operation. By appropriately configuring the electro-pneumatic valves in the brake cylinder and exhaust piping, brake pressure is obtained in a de-energized state. A fail-safe application of the electro-pneumatic brakes may not be desirable, however, where loss of power to the electro-pneumatic valves results not from a train break-in-two, but from an electrical malfunction on an individual car, since the brakes on such an individual car would be applied while the train continued to run. This could lead to thermal wheel damage, prematurely worn brake shoes, burned brake heads and possible derailment. On the other hand, fail-safe application of the brakes must be provided for in the event of a power failure that affects all of the cars, such as when a break-in-two occurs.

SUMMARY OF THE INVENTION

The object of the present invention, therefore, is to provide an electro-pneumatic brake system that operates in conjunction with a back-up pneumatic brake system in such a manner that the back-up pneumatic brake will become effective to automatically override the electro-pneumatic brake when a loss of power occurs due to a train break-in-two without becoming effective when an individual car or cars experience a power loss.

It is another object of the invention to integrate an electro-pneumatic brake control with an existing railroad freight car control valve in a manner that requires only a minimum of modification of the control valve without disturbing the existing pipe connections.

Still another object of the invention is to provide an integrated pneumatic/electro-pneumatic brake control system that maintains the existing pneumatic brake functionality and compatibility when employed with a train having cars that may not be equipped with electro-pneumatic controlled brakes. In accordance with the foregoing objectives, there is provided for a railroad freight car an integrated pneumatic/electro-pneumatic control system in which electro-pneumatic control means is cooperatively arranged with a conventional railroad car control valve device, which is normally stabilized in a release and charging position under control of brake pipe pressure that is normally maintained at the train running pressure to maintain the emergency reservoir charged with supply pressure. The control valve manual release valve portion is replaced with a solenoid valve portion at the release valve mounting face of a conventional AB, ABDW, or ABDX control valve device where the appropriate existing passages required for electro-pneumatic control are accessed.

BRIEF DESCRIPTION OF THE DRAWINGS

These and other objects and advantages of the invention will become apparent from the following more detailed explanation when taken in conjunction with the accompanying drawings in which:

FIG. 1 is an assembly view of a conventional ABD type control valve device having a release valve portion affixed to the control valve service portion at a mounting face thereof where specific ports may be accessed;

FIG. 2 is a partial diagrammatic view of the control valve device of FIG. 1 modified in accordance with the present invention; and FIG. 3 is a chart showing the status of application and release solenoid valves of the electro-pneumatic brake control of the present invention for different operating conditions of the integrated automatic pneumatic and electro-pneumatic brake control systems.

DESCRIPTION AND OPERATION

Referring to FIG. 2, there is shown an electro-pneumatic freight car brake control system including an ABD type control valve device 14, as is typically employed on a railroad freight car, modified to integrate an electro-pneumatic brake control with the conventional automatic pneumatic brake control in accordance with the present invention. In addition to modified control valve device 14, such a freight car brake control system includes a brake pipe 1, a brake cylinder 3, an auxiliary reservoir 5, an emergency reservoir 2, and a retainer valve 10. The ends of brake pipe 1 are provided with flexible hose and couplings (not shown) for connecting with the counterpart hose and couplings of an adjoining freight car in a freight train.

Control valve device 14 includes a mounting face 15 into which a brake passage C and a delivery passage C1 open. Also opening into mounting face 15 is a branch passage e5 of emergency reservoir passage e4, and a branch passage ex1 of exhaust passage ex. As shown in FIG. 1, conventional ABD, control valves include a service portion 16 and a manual release valve portion 17 connected to portion 16 at mounting face 15 having the aforementioned passage openings. It is the intent of the present invention to modify a conventional ABD, type control valve by replacing this manual release valve portion 17 with an electro-pneumatic valve portion 21 in order to incorporate an electro-pneumatic brake control with the existing pneumatic brake control.

Electro-pneumatic valve portion 21 includes a normally closed application solenoid valve 22 and a normally open release solenoid valve 24, each having a solenoid operator with a spring return in a two-way, two-position valve configuration. Solenoid valve portion 21 further includes a supply passage 30 that connects emergency reservoir branch passage e5 from mounting face 15 to the inlet of application solenoid valve 22, an exhaust passage 32 that connects the outlet of release solenoid valve 24 to exhaust branch passage ex1 at mounting face 15, and a delivery passage 31 that is interconnected between the outlet of solenoid application valve 22 and the inlet of solenoid release valve 24. This delivery passage 31 is connected by a branch passage and pipe 34 to one inlet of a double check valve device 35, the other inlet of which is connected by a pipe and passage 36 to delivery passage c1 at mounting face 15. A passage c2 connects the outlet of double check valve device 35 to brake passage c at mounting face 15.

In addition to electro-pneumatic valve portion 21, the electro-pneumatic brake control further includes a microprocessor unit 20 from which wires 26 and 28 are connected to the respective solenoid operators of solenoid application and release valves 22 and 24. A source of electrical power such as an on-board car battery 42 is provided to power the microprocessor and solenoid valves. A signal wire 44 is interconnected by suitable connectors (not shown) to a corresponding control wire of an adjoining car (not shown) to form a trainline via which control signals may be conducted from the locomotive to microprocessor 20. Alternatively, signal wire 44 may be replaced by a radio communication link via which control signals may be transmitted to microprocessor 20. Finally, a branch pipe 3b of brake cylinder pipe 3a is adapted to receive a transducer 46 from which a wire 48 is connected to microprocessor 20 to provide a feedback signal to the microprocessor corresponding to the instantaneous brake cylinder pressure.

As is well known, brake pipe 1 is charged with compressed air stored in the main reservoirs (not shown) of a locomotive to a predetermined running pressure that is established and maintained at the locomotive brake valve (not shown) when set in release position. As is also well known, control valve device 14 assumes a "release and charging" position in response to the pressure in the brake pipe 1 being charged. In this "release and charging" position, as shown in FIG. 2, compressed air is connected from brake pipe 1 to auxiliary reservoir 5 via branch pipe and passage 5a, passages b and b2, a passage k in slide valve 13 of the service piston 11, a chamber Y under the service piston diaphragm, passages a1 and a, and a supply passage and pipe 5a. In turn, compressed air is also conducted from chamber Y to emergency reservoir 2 via passage n in the service piston graduating valve 12, a passage m in slide valve 13, passages e4, e2 and supply passage and pipe 2a. From passage e4, the emergency reservoir air is also connected via branch passage e5 to the supply passage 30 in solenoid valve portion 21.

Concurrently, brake cylinder device 3 is vented to atmosphere via pipe and passage 3a, passages c, c2, the outlet of double check valve device 35, passages 36 and c1 groove t in slide valve 13, passage ex, passage and pipe 10a, and retaining valve 10.

Referring to the chart of FIG. 3, solenoid valves 22, 24 are both de-energized under control of microprocessor 20 during the aforementioned "release and charging" of control valve device 14. The emergency reservoir supply pressure in passage 30 is thus cut off from delivery passage 34, which is in turn vented via release solenoid valve 24, exhaust passages 32 and ex, passage and pipe 10a, and retainer valve 10. In this manner, the system is maintained in a charged condition and the brakes released, irrespective of the position of double check valve device 35.

When an electro-pneumatic brake application is desired, a control signal is conducted over wire 44, which is evaluated by microprocessor unit 20 in terms of the brake cylinder pressure feedback signal received via wire 48. Since brake cylinder pressure is exhausted during charging, as above-explained, a difference exists between the control and feedback signals indicative of a desired level of brake application. Microprocessor 20 operates accordingly to energize application solenoid valve 22 and to energize release solenoid valve 24, as indicated in the chart of FIG. 3 for an application condition. Application valve 22 thus shifts from its normally closed state to an open condition, while release valve 24 shifts from its normally open position to a closed position. Emergency reservoir pressure is thus supplied from passage 30 to brake cylinder device 3 via delivery passages 31, 34, double check valve device 35, brake passages c2, c, and passage and pipe 3a.

When brake cylinder pressure, as reflected by transducer 46, provides a feedback signal to microprocessor 20 corresponding to the signal conducted via control wire 44, microprocessor 20 operates to de-energize application solenoid valve 22. In its de-energized condition, valve 22 is returned to its normally closed position in which fluid pressure communication between supply passage 30 and delivery passage 31 is cut off, as indicated in the chart of FIG. 3 for a lap condition of the brakes.

Should brake cylinder pressure leak off and thus drop below the desired brake application pressure, microprocessor 20 will re-establish the emergency reservoir supply path to brake cylinder 3 in order to maintain the required pressure until a further increase or decrease of the brake application is desired, as reflected by a corresponding signal at wire 44.

During the time that the brakes are being applied and released under electro-pneumatic control, brake pipe 1 is maintained at its pre-determined running pressure and control valve device 14 accordingly remains in its release position, as shown, in which the emergency reservoir 2 continues to be charged to provide an inexhaustible supply of air for the electro-pneumatic brake control.

In the event a power failure occurs, due to a dead battery 42, a malfunction of microprocessor 20, or a faulty solenoid of application and release valves 22, 24, both solenoid valves will revert to a de-energized condition, thereby effecting a release of any brake cylinder pressure that exists at the time. In that such a power failure condition would be expected to occur only on an individual car basis, as opposed to each car of a train or even a plurality of cars, the percentage of brake reduction would be relatively inconsequential in terms of a train.

On the other hand, should a power loss occur due to a train break-in-two, in consequence of which the train brake pipe 1 breaks, each car control valve device 14 will respond to the resultant reduction of brake pipe pressure to effect an emergency brake application throughout both halves of the separated train to bring the train to a safe stop. Such a pneumatic brake control application of the brakes occurs irrespective of the fact that the solenoid application and release valves are arranged to fail to a brake release condition, as heretofore explained. This is possible since double check valve device 35 separates the automatic pneumatic and electro-pneumatic brake controls. It will be appreciated, therefore, that when service piston 11 of control valves 14 on each car moves to application position in response to an emergency reduction of brake pipe pressure, brake cylinder delivery passage c1 is cut off from exhaust passage ex and connected to slide valve passage d. In this manner, compressed air is supplied from auxiliary reservoir 5 to passage 36 in electro-pneumatic valve portion 21 and thence via double check valve device 35 to brake cylinder delivery passage c2 where it combines with the compressed air supplied via the control valve emergency portion (not shown) to charge brake cylinder 3 to the appropriate emergency brake pressure. In consequence of the double check valve outlet being pressurized via passage 36 associated with the automatic pneumatic brake control, passage 34 associated with the electro-pneumatic brake control is cut off from the double check valve outlet, thus preventing brake cylinder pressure from exhausting via the solenoid release valve exhaust path in the de-energized condition in which it fails.

In addition to providing automatic fail-safe emergency back-up brake control during such power failure as occurs due to a break-in-two, the automatic pneumatic brake control may also be employed under manual control of brake pipe pressure, in which case control valve device 14 is operated in accordance with the well-known operation of ABD, ABDW and ABDX type control valves to provide automatic pneumatic service and emergency brake control on "limp-in" basis. When the automatic pneumatic brake control is thus employed, the control signal transmitted via control wire 44 is regulated to cause microprocessor 20 to maintain solenoid application and release valves 22 and 24 de-energized consistent with a release condition of the electro-pneumatic brake control.

Pressure relief valve 50 is provided to prevent an overcharge condition of brake cylinder 3 from developing when an emergency application occurs at the time an electro-pneumatic application is in effect, since any air supplied to the brake cylinder in accordance with the electro-pneumatic application is replenished in order to maintain a continuous source of supply air. In thus providing inexhaustibility, however, it will be understood that full emergency brake pressure is always available, resulting in excessive brake pressure when an electro-pneumatic application is already in effect. Relief valve 50 blows off any pressure in excess of a predetermined emergency pressure to limit the maximum brake pressure capable of being obtained.

We claim:

1. A combined automatic pneumatic and electro-pneumatic brake control system for a railroad freight car comprising:

a) a brake pipe charged with fluid at a pre-determined train operating pressure;

b) a reservoir charged with fluid under pressure;

c) a brake cylinder device;

d) pneumatic control valve means having a control passage to which said brake pipe is connected, a supply passage to which said reservoir is connected, a brake passage to which said brake cylinder device is connected, an exhaust passage connected to atmosphere, and a first delivery passage, said pneumatic control valve means being operative in response to variation of said brake pipe fluid pressure for controlling fluid pressure communication between said supply passage and said first delivery passage, and between said first delivery passage and said exhaust passage;

e) respective first, second, third, and fourth ports of said supply passage, said brake passage, said exhaust passage and said first delivery passage;

f) means for receiving a brake command signal;

g) electro-pneumatic means operative responsive to said brake command signal for controlling fluid pressure communication between said supply passage and a second delivery passage and between said second delivery passage and said exhaust passage, including:
  (i) an application solenoid valve having an inlet and outlet, said inlet being connected to said supply passage at said first port;
  (ii) a release solenoid valve having an inlet and an outlet, said outlet being connected to said exhaust passage at said third port;
  (iii) said second delivery passage being interconnected between said outlet of said application valve and said inlet of said release valve; and
  (iv) a double check valve device having a first inlet connected to said first delivery passage at said fourth port, a second inlet connected to said second delivery passage, and an outlet connected to said brake passage at said second port.

2. A brake control system as recited in claim 1, wherein said pneumatic control valve means further includes a mounting face having said first, second, third and fourth ports.

3. A brake control system as recited in claim 2, further including a body portion affixed to said mounting face, said body portion having said application solenoid valve and said release solenoid valve.

4. A brake control system as recited in claim 3, wherein said body portion further includes first, second, third and fourth passages via which fluid pressure communication is established between said first port and said inlet of said application valve, between said second port and said outlet of said double check valve device, between said third port and said outlet of said release valve, and between said first delivery passage and said first inlet of said double check valve device.

* * * * *